(12) United States Patent
Ford et al.

(10) Patent No.: US 7,898,749 B2
(45) Date of Patent: Mar. 1, 2011

(54) MULTIPLE REFLECTIVE LENSES AND LENS SYSTEMS

(75) Inventors: Joseph Ford, Solana Beach, CA (US); Eric Tremblay, La Jolla, CA (US); Shaya Fainman, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 594 days.

(21) Appl. No.: 11/916,062

(22) PCT Filed: Jun. 2, 2006

(86) PCT No.: PCT/US2006/021417

§ 371 (c)(1),
(2), (4) Date: Nov. 30, 2007

(87) PCT Pub. No.: WO2007/055742

PCT Pub. Date: May 18, 2007

(65) Prior Publication Data

US 2010/0188856 A1    Jul. 29, 2010

Related U.S. Application Data

(60) Provisional application No. 60/687,550, filed on Jun. 3, 2005.

(51) Int. Cl.
*G02B 17/00* (2006.01)

(52) U.S. Cl. .................. 359/726; 359/727; 359/731; 359/732

(58) Field of Classification Search .................. 359/726, 359/727, 730, 731, 732
See application file for complete search history.

(56) References Cited

U.S. PATENT DOCUMENTS 3,681,690 A    8/1972   Mary (Continued)

OTHER PUBLICATIONS

Tremblay, E.J. et al., Ultra-Thin Folded Imager, Optical Society of America, 2005.

(Continued)

*Primary Examiner*—Jack Dinh
(74) *Attorney, Agent, or Firm*—Perkins Coie LLP

(57) ABSTRACT

A variety of lenses, lens assemblies, imaging devices, applications for such lenses, assemblies and devices, and related methods of operation and manufacturing are disclosed. At least some embodiments of the invention relate to a lens that includes first and second inward-facing surfaces that are each at least partly reflective. The lens further includes a first aperture that is positioned around at least a portion of an outer periphery of one of the first and second inward-facing surfaces, and a second aperture existing proximate a central region of the lens. The light proceeding within the lens between the first and second inward-facing surfaces is reflected at least twice on at least one of the first and second inward-facing surfaces as it travels between the first aperture and the second aperture.

43 Claims, 9 Drawing Sheets

U.S. PATENT DOCUMENTS

| | | |
|---|---|---|
| 4,576,447 A | 3/1986 | Korsch |
| 5,757,557 A | 5/1998 | Medvedev et al. |
| 5,793,538 A | 8/1998 | Cameron et al. |
| 6,169,637 B1 | 1/2001 | Tsunashima |
| 6,859,334 B1 | 2/2005 | Kuiseko et al. |
| 2002/0001146 A1 | 1/2002 | Nanba |

OTHER PUBLICATIONS

Draganov, Vladimir et al., Compact Telescope for Free Space Communications, Proc. of SPIE vol. 4767, pp. 151-158.

Cathey, W. Thomas et al., Applied Optics, vol. 41, No. 29, Oct. 10, 2002, pp. 6080-6092.

Mahajan, Virendra, Imaging with Obscured Pupils, Optics Letters, vol. 1, No. 4, Oct., 1977, pp. 128-129.

Laikin, M., Catadioptric and Mirror Optical Systems, Lens Design, Chapter 15, pp. 181-201.

Tremblay, Eric J., et al., Ultrathing Four-Reflection Imager, Applied Optics, vol. 48, No. 2, Jan. 10, 2009, pp. 343-354.

Tremblay, Eric J., et al. Relaxing the Alignment and Fabrication Tolerances of Thin Annular Folded Imaging Systems Using Wavefront Coding, Applied Optics, vol. 46, No. 27, Sep. 20, 2007, pp. 6751-6758.

Tremblay, Eric J., et al., Ultrathin Cameras Using Annular Folded Optics, Applied Optics, vol. 46, No. 4, Feb. 1, 2007, pp. 463-471.

MULTIPLE REFLECTIVE LENSES AND LENS SYSTEMS

CROSS-REFERENCE TO RELATED APPLICATIONS

This application claims the benefit of U.S. provisional patent application No. 60/687,550 entitled "Ultra-Compact and Achromatic Lens" filed on Jun. 3, 2005, which is hereby incorporated by reference herein.

STATEMENT REGARDING FEDERALLY SPONSORED RESEARCH OR DEVELOPMENT

This invention was made with United States Government support awarded by the following agency: Defense Advanced Research Projects Agency (DARPA). The United States Government has certain rights in this invention.

FIELD OF THE INVENTION

The present invention relates to optical lenses and more particularly relates to lenses that can be employed in a variety of applications including, for example, cameras and other imaging systems.

BACKGROUND OF THE INVENTION

Optical lenses are employed in a variety of devices for many purposes such as modifying focus and magnification. Among the devices in which optical lenses are of particular significance are cameras and imaging devices. With the continuing trend toward increased miniaturization, particularly in consumer electronics, the need to develop cameras and other imaging devices of reduced size is also increasing. This is particularly the case given that many small consumer electronics devices, such as wireless telephones, increasingly are equipped with cameras and/or other imaging devices.

Conventional optical lenses employed in cameras and imaging devices often lack compactness due to the number of lens components required by the lenses. For example, a compound refractive lens might require six different lens elements stacked in a serial manner to achieve desired optical characteristics. Conventional telescopic devices also are unsuitable for use as lenses in compact camera and other imaging devices. Even catadioptric devices, such as Schmidt-Cassegrain or Maksutov-Cassegrain devices, are too large for successful implementation in these applications. In particular, these various lenses and related devices are often excessively physically long (as viewed generally perpendicular to the direction of incident light), relative to the cameras and other imaging devices within which they are to be implemented. These lenses can be scaled down to reduce their length, but simply scaling the lens size reduces the total light energy collected and the optical resolution.

Given the need for cameras and other imaging devices of reduced size, and consequently the need for optical lenses of reduced size, it would be advantageous if new lens(es) and/or lens system(s) could be developed that were substantially more compact than conventional lenses. In particular, it would be advantageous if the new lens(es)/lens system(s) were significantly shorter in length (where length is the dimension that is generally parallel to the direction of incoming incident light) than conventional devices.

BRIEF SUMMARY OF THE INVENTION

The present inventors have recognized that the principles underlying conventional catadioptric devices can be extended to result in a lens design that is significantly more compact than conventional lenses. More particularly, a reduced-size lens can be achieved if one or both of the pair of reflecting surfaces used in a conventional catadioptric device are crafted to achieve more than one reflection of light, such that more than two reflections of light occur between the pair of surfaces, e.g., to achieve three, four, five, six, or possibly more reflections. The present inventors further have recognized that a multiple reflective lens surface (on which two or more reflections occur) for use in such a lens in at least some embodiments can be achieved by forming multiple, substantially-annular and concentric reflective zones of appropriate directionality, where the zones are illuminated in sequence by incident light rays. The present inventors additionally have recognized that, through the use of such lens(es), and in at least some embodiments, a variety of special combination lens devices also become possible by, for example, stacking two or more of such lens devices, stacking one or more of such lens devices with one or more conventional lens devices, and/or arranging one or more of such lens devices side-by-side.

The two reflective surfaces of one of the above-mentioned lenses can be fabricated in a variety of manners depending upon the embodiment, for example, by way of diamond machining. In at least some embodiments, the two surfaces are formed merely as the two sides of a single solid element (a solid lens) while in at least some other embodiments the surfaces can be two mechanically separate elements on each side of an air gap (a hollow lens), or take some other form. Depending upon the design of the lens, in at least some cases, focusing of the lens can be accomplished by moving the lens relative to the image plane, as in conventional camera lenses, or by "squeeze focusing," which involves adjusting the spacing between the two reflective surfaces.

More particularly, in at least some embodiments, the present invention relates to a lens that includes a first inward-facing surface that is at least partly reflective, and a second inward-facing surface that is at least partly reflective. The lens further includes a first aperture that is positioned around at least a portion of an outer periphery of one of the first and second inward-facing surfaces, and a second aperture existing proximate a central region of the lens. Light proceeding within the lens between the first and second inward-facing surfaces is reflected at least twice on at least one of the first and second inward-facing surfaces as it travels between the first aperture and the second aperture.

Additionally, in at least some embodiments, the present invention relates to an imaging system that includes means for sensing light, and a first lens. The first lens includes a first inward-facing surface that is at least partly reflective, and a second inward-facing surface that is at least partly reflective. The first lens further includes a first aperture that is positioned around at least a portion of an outer periphery of one of the first and second inward-facing surfaces, and a second aperture existing proximate a central region of the lens and at which is positioned the means for sensing light. Light proceeding within the lens between the first and second inward-facing surfaces is reflected at least twice on at least one of the first and second inward-facing surfaces as it travels from the first aperture to the second aperture. In at least some such embodiments (but not necessarily all) second and third lenses can also be employed along with the first lens.

Further, in at least some embodiments, the present invention relates to a light filter device that includes a plurality of substantially parallel light transmitting pathways, and a structure extending between and substantially dividing the substantially parallel light transmitting pathways from one another. The structure includes at least one of a honeycomb-shaped structure and a further structure including a plurality of concentric rings.

Additionally, in at least some embodiments, the present invention relates to a method of transmitting light. The method includes receiving the light at a first aperture of a curved lens structure, and reflecting the light between first and second inward-facing surfaces of the curved lens structure, where at least two reflections occur on at least one of the first and second inward-facing surfaces. The method further includes providing the light at a second aperture of the curved lens structure.

DETAILED DESCRIPTION OF THE PREFERRED EMBODIMENT

Figure 1A:
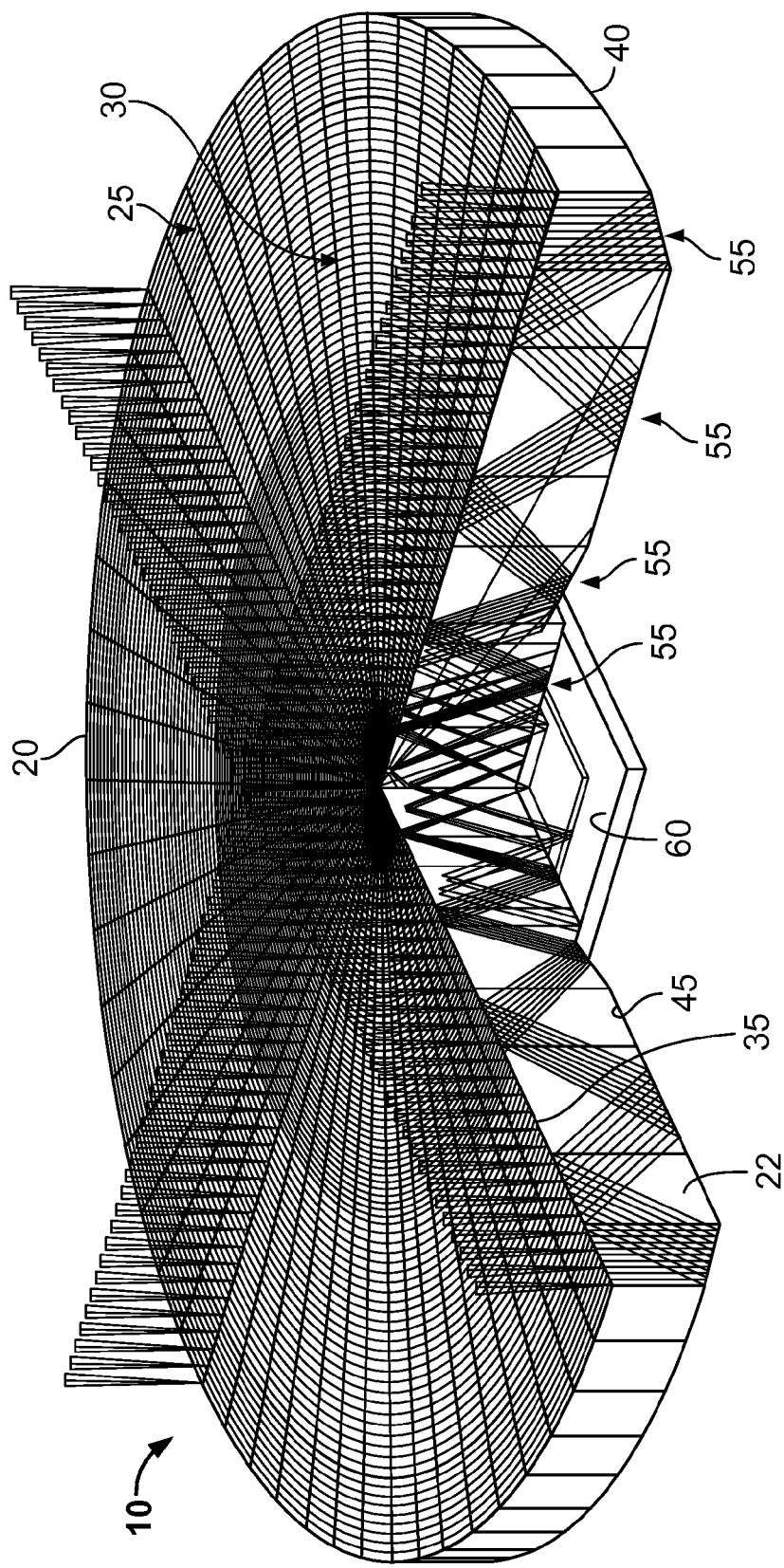
FIGS. 1A and 1B respectively show a perspective, partially cut-away view and a related cross-sectional view of a lens and related imaging system employing that lens, where light received by the lens is internally reflected eight times, in accordance with an embodiment of the present invention.
Figure 1B:
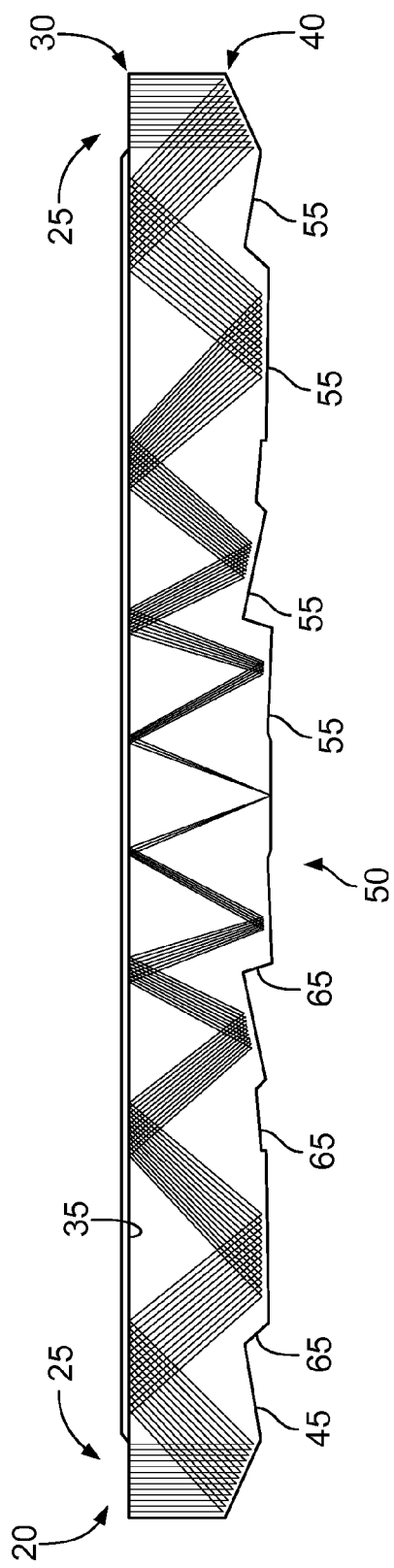

Referring to FIG. 1A, a perspective, partially cut-away view is provided of components of an imaging system 10 employing a multiple reflective lens 20 in accordance with certain embodiments of the present invention. In particular, FIG. 1A shows the generally circular/cylindrical lens 20 to have an approximately 90-degree section removed so as to better reveal exemplary paths followed by light that is received into an interior 22 of the lens. FIG. 1B further provides a cross-sectional view of the lens 20.

As shown in FIGS. 1A and 1B, the multiple-reflection lens 20 includes a pair of front and rear reflecting plates 30 and 40, respectively. Light enters the lens 20 along a ring aperture 25 extending around the front reflecting plate 30 proximate its outer periphery. The ring aperture 25 typically is quite narrow (e.g., for the lens 20 shown in FIG. 1B to have an outer diameter of 60 mm, the inner diameter of the ring aperture 25 could be 53.5 mm; note also that the thickness of the lens in this embodiment is 5 mm). After entering the ring aperture 25, the light is reflected off of inner surfaces 35, 45 of the respective reflecting plates 30, 40 back and forth several times. As the light is reflected back and forth, the light is directed progressively circumferentially inward. Eventually, the light is reflected out of a central aperture 50 (see FIG. 1B) existing within the rear reflecting plate 40.

As shown particularly in FIG. 1A, the imaging system 10 including the lens 20 also includes an imager 60 (or other light sensing or receiving device) that is positioned adjacent to the aperture 50 of the lens. The imager 60 can be, for example, a pixel array sensor device such as a 2592×1944 OV5610 CMOS imager manufactured by OmniVision Technologies, Inc. of Sunnyvale, Calif., or a variety of other camera or imaging-type devices. The light received at the lens 20 and subsequently at the imager 60 can be processed at any of a variety of processing devices (e.g., a microprocessor, not shown) using conventional signal processing techniques, for example, deconvolution in combination with a spreading function. In some alternate embodiments, a light source rather than (or in addition to) a light receiving device such as the imager 60 can be positioned at the central aperture 50, in which case the lens 20 could be used to send light out of the ring aperture 25.

In contrast to conventional Cassegrain-type telescopes in which light is reflected once at each of two surfaces, in the present embodiment light is reflected at each of the inner surfaces 35, 45 four times before exiting out of the central aperture 50. Thus, the lens 20 is an 8-reflection, "8x-folded" or "8-folded" lens. As shown in FIG. 1B, the front inner surface 35 is a planar (or substantially planar, e.g., slowly varying) surface. Also, again in contrast to conventional Cassegrain-type telescopes, while the front inner surface 35 is a planar (or substantially planar) reflective surface, the rear inner surface 45 is not planar, as best shown in FIG. 1B. Rather, the rear inner surface 45 includes several (in this case, four) substantially concentric, circular zones or surfaces 55 that reflect light that is incident upon those zones in multiple different directions. The combination of a curved surface and a fully-planar surface eliminates the need for precise lateral alignment between the two reflective surfaces.

The zones 55 in the present embodiment are reflective, aspheric lens surfaces, although in alternate embodiments the surfaces could take other forms (also, as described below with reference to FIGS. 2A and 2B, the front inner surface 35 also could be formed from multiple such different surfaces rather than be flat). The exact shapes/angles of direction of the zones 55 that are appropriate for reflecting/directing light in the desired manner can be determined using conventional optical techniques/calculation methods/computer programs. For example, in at least some embodiments, the Zemax® ray tracing/lens design program available Zemax Development Corporation of Bellevue, Wash. can be employed. In the present embodiment, the zones 55 are diamond machined, although in other embodiments other techniques can be used to make these zones.

Additionally, to prevent or limit the effects of stray light or undesirable reflections, the zones 55 in the present embodiment are separated from one another by several concentric blackened detents 65 that are formed on (e.g., diamond machined onto) the face of the lens. Further, in the present embodiment, angle-selective dielectric coatings are applied to the zones 55 such that the zones only transmit light at the desired angles. As shown in FIG. 1B, the zones 55 and detents 65 are all situated around a central image plane at or proximate to the central aperture 50, where the imager 60 is situated. In the present embodiment, at least in part because the front inner surface 35 is flat (or substantially flat), lateral alignment tolerances are readily achievable.

As a result of the repeated reflections that occur between the front and rear inner surfaces 35, 45, the lens 20 provides a short physical range of motion required to achieve focus relative to conventional lenses in which focus is typically accomplished by adjusting the distance between the entire lens and the focal plane. The more reflections that occur, the greater are the advantages. As will be described further below, these advantageous effects are particularly useful when achieving focusing, particularly in the form of "squeeze focusing".

Figure 2B:
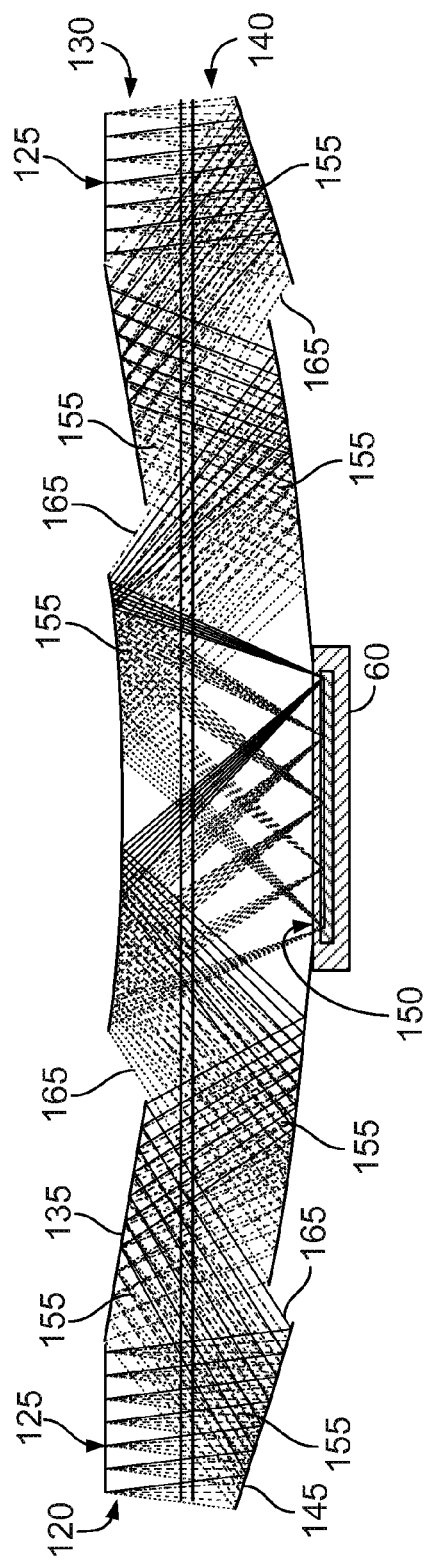
FIGS. 2A and 2B respectively show a perspective, partially cut-away view and a related cross-sectional view of a lens and related imaging system employing that lens, where light received by the lens is internally reflected four times, in accordance with an embodiment of the present invention.
Figure 2A:
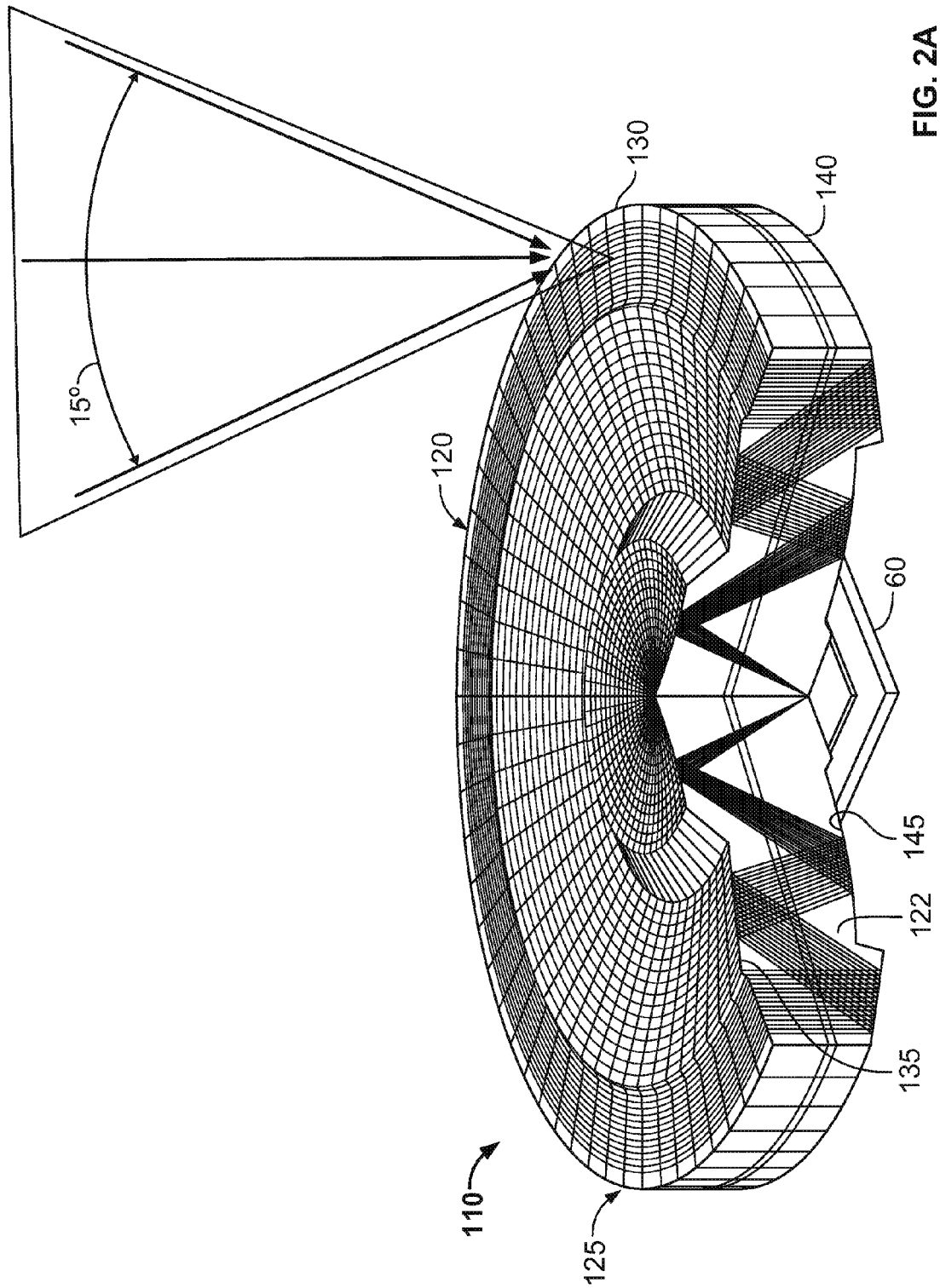

Turning to FIG. 2A, a perspective, partially cut-away view is provided of components of another embodiment of an imaging system 110 employing a multiple-reflection lens 120 in accordance with additional embodiments of the present invention. As with FIG. 1A, FIG. 2A shows the generally circular/cylindrical lens 120 to have an approximately 90-degree section removed so as to better reveal exemplary paths followed by light that is received into an interior 122 of the lens. FIG. 2B further provides a cross-sectional view of the lens 120.

The lens 120 of FIGS. 2A and 2B is similar in design to the lens of FIGS. 1A and 1B insofar as the lens includes a pair of front and rear reflecting plates 130 and 140, respectively. Again, light enters the lens 120 along a ring aperture 125 extending around the front reflecting plate 130 proximate its outer periphery. The ring aperture 125 again typically is quite narrow (e.g., for the lens 120 shown in FIG. 2B to have an outer diameter of 30 mm, the inner diameter of the ring aperture 125 could be 23.6 mm; note that the thickness of the device as shown again is 5 mm). After entering the ring aperture 125, the light is reflected back and forth between inner surfaces 135, 145 of the respective reflecting plates 130, 140 multiple times. As the light is reflected back and forth, the light is directed progressively circumferentially inward, and then is reflected out of a central aperture 150 (see FIG. 2B) existing within the rear reflecting plate 140 and towards an imager, which can be the same imager 60 as shown in FIG. 1A (in alternate embodiments, as with the imaging system 10, the imager could be replaced with or supplemented by a light source).

In contrast to the lens 20 of FIGS. 1A and 1B, however, light entering the lens 120 of FIGS. 2A and 2B is reflected not eight times but rather is reflected only four times (e.g., two times on each of the reflecting plates 130, 140), and thus can be considered a "4-folded" lens. Further, while the lens 120 like the lens 20 includes a plurality of reflective, substantially concentric and circular, angle-selective dielectric-coated aspheric lens zones or surfaces 155 for directing light within the interior 122 of the lens and a plurality of blackened detents 165 separating the zones 155 from one another, the zones 155 and detents 165 exist on both of the inner surfaces 135 and 145 of the respective reflecting plates 130 and 140 rather than merely on the inner surface of one of those reflecting plates.

Thus, while the front reflecting plate 30 of the lens 20 is planar (or substantially planar) and only the rear reflecting plate 40 of that lens has the zones 55 and detents 65, neither of the front and rear reflecting plates 130 and 140 of the lens 120 is planar (or substantially planar) and each of those plates has some of the zones 155 and detents 165. More specifically as shown, each of reflecting plates 130 and 140 has a respective pair of the zones 155 separated by a respective one of the detents 165. Again, the exact shapes/angles of direction of the zones 155 that are appropriate for reflecting/directing light in the desired manner can be determined using conventional optical techniques/calculation methods/computer programs. As shown in FIG. 2B, the lens 120 in the present embodiment has approximately a 15 degree full-angle field of view.

Although FIGS. 1A-2B show two exemplary lenses 20, 120 in which respectively four and two reflections take place at each of the inner surfaces 35, 45, 135, 145, the present invention is intended to encompass numerous other embodiments of lenses in which different numbers of reflections other than four or two reflections occur at each of the inner surfaces 35, 45, 135, 145. For example, in one alternate embodiment, a lens would have three reflections at each of the inner surfaces and constitute a "6-folded" lens. Also, in other alternate embodiments, lenses would have more than four reflections at each of those surfaces.

Further, in at least some embodiments, it would be possible for a lens to have an odd number of total internal reflections, for example, where two reflections occurred on one of the inner surfaces and three reflections occurred on the other of the reflecting plates. Such embodiments typically would not be preferred, however, since such embodiments would typically require that the imager or other light receiving/emitting device be placed on the same side of the lens as that on which light was incident (or from which light was emitted from the lens). In general, the present invention is intended to encompass any of a variety of different lenses in which more than one reflection occurs at each of, or at least one of (e.g., the present invention is also intended to encompass a lens having three internal reflections, only one of which occurs on one of the inner surfaces), the inner surfaces of the lenses. Such lenses can be termed "multiple reflective", "multiple folded" or "multiple-concentric-zone reflective" lenses, and lens systems employing such lenses can be termed "folded optic" or "folded imager" (or "folded light emission") systems.

Figure 3:
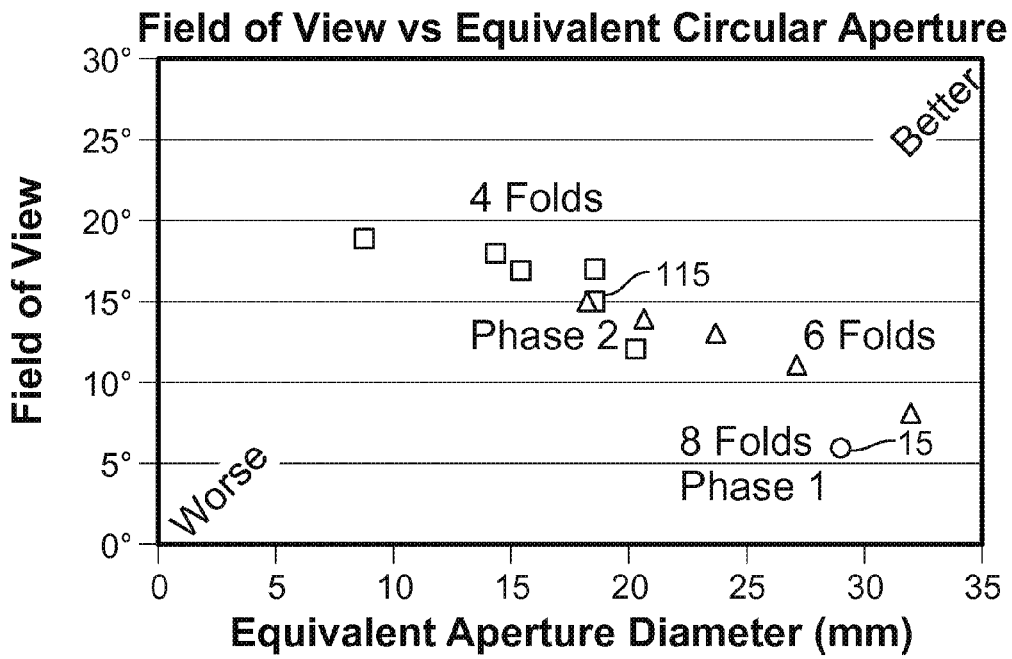
FIG. 3 is a graph showing exemplary variation of the field of view with equivalent aperture diameter for various multi-reflective lenses such as those of FIGS. 1A-2B.

Referring to FIG. 3, a graph is provided showing exemplary performance characteristics of various embodiments of multiple reflective lenses such as those of FIGS. 1A-2B. In particular, exemplary variation of field of view of different lenses is plotted versus the equivalent aperture diameter of the lenses. In particular, characteristics of various lenses ranging from 4-folded lenses, 6-folded lenses and 8-folded lenses are shown respectively by diamonds, squares, triangles and circles, respectively. The exemplary performance of a 4-folded lens comparable to the lens 120 of FIGS. 2A-2B is marked by reference numeral 115, while that of an 8-folded lens comparable to the lens 20 of FIGS. 1A-1B is marked by a reference numeral 15. From FIG. 3, it is evident that, generally speaking, equivalent apertures of the lenses increase with the number of folds/reflections while the fields of view of the lenses decrease with the number of folds/reflections. Since both high equivalent apertures and high fields of view can be desirable, whether a particular lens is chosen for a particular application will depend upon the needs of the particular application in view of the characteristics of the lens.

Figure 4A:
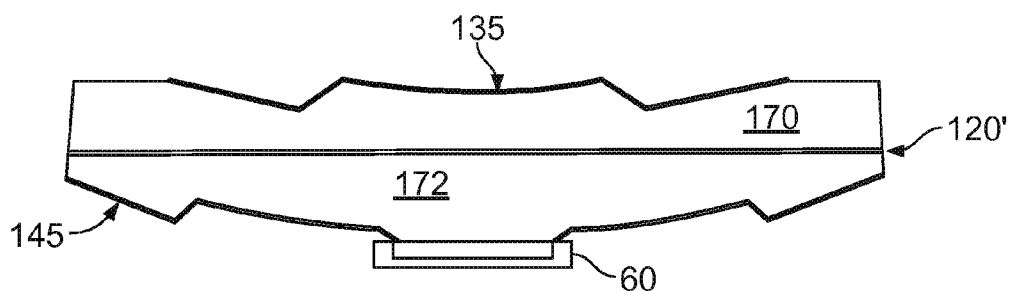
FIGS. 4A and 4B show how the lens of FIGS. 2A and 2B can be formed from two lens structures, with FIG. 4A showing the two lens structures being positioned adjacent to one another and FIG. 4B showing schematically how, in at least some embodiments, the two lens structures can be moved relative to one another to achieve a variation in focal length of the lens.
Figure 4B:
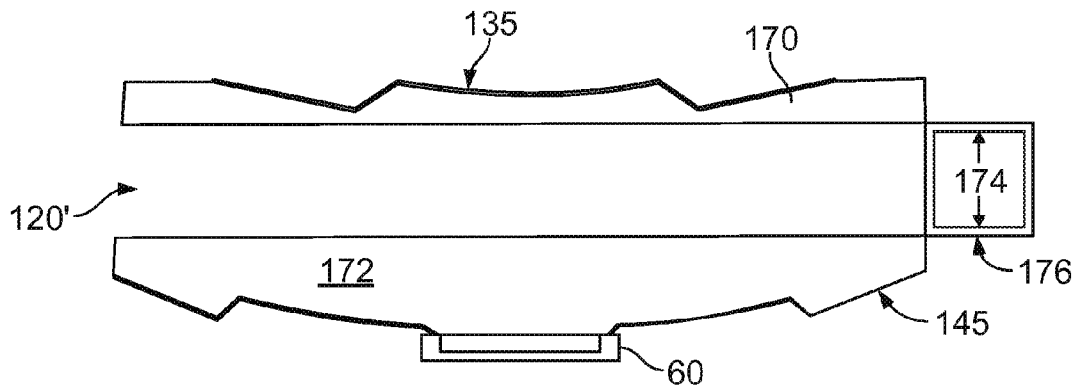

Although in the embodiments of FIGS. 1A-2B the distances separating the front and rear inner surfaces 35, 45 and 135, 145 are fixed and remain constant, in alternate embodiments it would be possible to move the inner surfaces relative to one another to increase/decrease the distance between those surfaces and thereby modify the focus of the lens, a method that can be termed "squeeze focusing". In accordance with some embodiments of the invention, therefore, the focusing of a lens not only can be achieved by moving the lens relative to the image plane (e.g., relative to the target being imaged) but also (or instead) can be achieved by moving the inner surfaces of the lenses toward and/or apart from one another. For example, as shown in FIGS. 4A-4B, one alternate version of the 4-folded lens 120 of FIGS. 2A-2B, shown as a lens 120', can be formed from first and second CaF2 blanks 170 and 172, respectively, which have been separately diamond turned and coated. As shown in FIG. 4A, the blanks 170, 172 can be positioned adjacent to one another (or only slightly apart so that a slight gap is formed therebetween).

Nevertheless, as particularly shown in FIG. 4B, the blanks 170, 172 can also be moved apart by an arbitrary distance 174. By varying the relative distance 174 between the blanks 170, 172, the focus of the lens 120' can be changed. Indeed, due to the mechanical leverage afforded by the multiple reflections at each of the inner surfaces 135, 145, such a variable-focus lens can achieve a given amount of change in its focusing power with much less relative movement of the inner surfaces than would be necessary in the case of conventional lenses (in terms of moving the lenses with respect to their imaging planes). For example, a change in focus of a 4-folded lens such as the lens 120' from approximately ∞ to 1 meter could be achieved by merely varying the relative positions of the blanks 170, 172 by as little as 0.1 mm. The degree to which a multiple reflective lens employing squeeze focusing can surpass conventional lenses in its ease of focusing depends upon the number of reflections that occur at the inner surfaces 135, 145 within the lens. As the number of reflections per inner surface increases, the lens will be able to achieve greater changes in focus with the same amount of relative movement of the inner surfaces 135, 145.

As further shown in FIG. 4B, relative movement of the blanks 170, 172 away (or toward) one another can be achieved through the use of an actuator 176. The actuator 176, which desirably can achieve highly accurate positional variations of the blanks 170, 172, can take a variety of forms depending upon the embodiment. For example, the actuator 176 in one embodiment is a piezoelectric actuator that, upon receiving high voltage inputs, is capable of achieving small amounts of movement in a highly accurate manner. Also, in alternate embodiments, lenses controlling the fluid volume/pressure within 3 elastomer pistons, or other actuators, can change the effective relative positioning of the inner surfaces, thus changing the focus of the lenses.

As mentioned above, in at least some embodiments, to achieve lens surfaces (particularly the inner surfaces 35, 45, 135, 145) having the desired shape in a consistent, accurate manner, diamond machining/grinding can be employed. In other embodiments, the lenses can be mass-produced with a single-impression molding, since all of the zones 55/155 and detents 65/165 of a given lens are on a single face and/or an outer face of the lens. Further, in at least some other embodiments, the lenses can be fabricated to have a hollow air cavity between all-reflective (or partly-reflective) surfaces. In at least some such embodiments, the lenses can support an ultra-broad optical spectrum (ultraviolet to far infrared) for multi-spectral imaging.

Further, although in the embodiments of FIGS. 1A-2B and 4A-4B all of the zones 55, 155 and detent(s) 65, 165 associated with a given one of the surfaces 35, 45, 135, 145 are machined into/onto a single reflecting plate (e.g., one of the plates 30, 40, 130, 140 or one of the blanks 170, 172), this need not be the case. For example, in some alternate embodiments, the zones 55, 155, and/or detent(s) 65, 165 associated with a given one of the surfaces 35, 45, 135, 145 can be formed on several distinct structure(s) (e.g., concentric annular structures) that are then combined with one another. Further for example, in one such alternate embodiment, a blank employed to form the surface 145 could be formed from the combination of an inner ring forming one of the zones 155 (and having an inner orifice corresponding to the aperture 150), an outer ring forming a second of the zones 155, and an intermediate ring to be positioned/assembled in between the inner and outer rings that served as the detent 165 of the surface 145.

The imaging systems 10, 110 and lenses 20, 120 (and 120') described above and other multiple reflective lenses/lens systems in accordance with various embodiments of the present invention can be implemented in a variety of systems and applications. For example, such lenses/imaging systems are appropriate for implementation in various infrared telescopes. This is because, due to their design and relative low weight/bulk (and the materials used in constructing the lenses), the lenses/imaging systems can advantageously result in a lower cantilevered mass for such a telescope. Embodiments of the present invention also can be especially appropriate for use in applications in which a long focal length is desired despite having only a small space for a lens, and/or in which lower contrast ratios than those achieved by many conventional cameras are nonetheless adequate.

For example, in at least some embodiments, imaging systems such as the imaging systems 10, 110 with the lenses 20, 120 and imager 60 can serve as an ultra-compact telephoto imaging system that is approximately the shape of a lens cap. Due to the multiple reflections that occur within the lenses 20, 120, each of the imaging systems 10, 110 can be implemented as part of a "flat camera" in which a lens with a 35 mm focal length has a total track length of only 5 mm, approximately eight times thinner than conventional camera lens/imaging systems. Further for example, the imaging systems 10, 110 are appropriate for use in miniature cameras such as those employed in cellular telephones or security cameras. Also, the imaging systems 10, 110 are appropriate for incorporation into high-resolution cameras made in the shape of a credit card.

Lenses such as the lenses 20, 120 are more effective than conventional lenses when used in cameras particularly insofar as the lenses allow for better, higher imaging resolution and higher light-gathering capability (effective aperture) than that provided by comparable lenses. Because light enters the lenses 20, 120 around the relatively wide perimeters formed by the ring apertures 25, 125, the lenses 20, 120 receive light from a wider array of angles than would be the case in comparable conventional lenses, which in order to fit in the same or similarly small spaces must necessarily be much smaller in their width. At the same time, it should be noted that, comparing lenses of equal cross-sectional area, a conventional lens will allow for higher contrast ratios than lenses such as the lenses 20, 120, since the latter lenses only receive light by way of the relatively small (e.g., thin) ring apertures 25, 125.

In alternate embodiments, imaging systems and/or lenses such as the imaging systems 10, 110 and/or the multireflective lenses 20, 120 can be used in a variety of other applications. For example, each of the lenses 20, 120 can be used as a laser collimator for optical communications or remote sensing. Also, the lenses 20, 120 are applicable for use in military/aerospace applications, such as applications involving unmanned aerial vehicles and on wearable/helmet-mounted cameras. The ultraviolet to far infrared spectral bandwidth of the lenses in at least some embodiments particularly allows multi-spectral imaging and remote spectroscopy, which are useful in military and homeland defense (e.g., remote chemical sensor) applications. Further, with minor modifications (e.g., running the lens design optimization program with different targets), the lenses can be scaled to operate at a variety of different wavelengths, focal lengths, and imaging conjugates. The lens designs can be further modified with pupil wavefront distortion functions and post-detection processing to maintain optical resolution with increased manufacturing and environmental tolerances.

As mentioned above, the effects of stray light and glare can be largely eliminated in connection with the 8-folded lens 20 of FIGS. 1A-1B due to the presence of the detents 65 and the dielectric coating on the zones 55. In particular, due to the relatively large number of detents 65, it is difficult for stray light to pass between the ring aperture 25 and the central aperture 50 without following a path involving the eight reflections between the reflecting plates 30, 40. By contrast, although the detents 165 and dielectric coating on the zones 155 of the 4-folded lens 120 of FIGS. 2A-2B do provide some benefit in terms of reducing stray light, they do not work as well in eliminating the effects of stray light as the corresponding structures of the lens 20, particularly since there is only one of the detents 165 located on each of the reflecting plates 130, 140. In order to further reduce the effects of stray light/ glare, therefore, in some embodiments an additional "honeycomb" light filtering structure or baffle can be mounted onto or otherwise positioned in front of the ring aperture 125 of the lens 120.

Figure 5A:
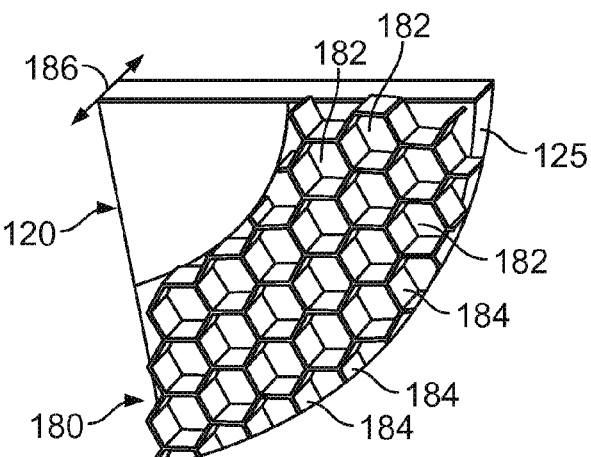
FIG. 5A is a perspective, cut-away view of a section of a lens having mounted thereon an exemplary honeycomb light filtering structure.

FIG. 5A in particular shows a cut-away portion of such a honeycomb light filtering structure 180. As shown, the structure is essentially an assemblage of hexagonal transparent glass rods 182 arranged side-by-side one another (lengthwise), between which are positioned thin walls 184 that are generally hexagonally-shaped and surround and separate the glass rods from one another. In order for light to enter the ring aperture 125 positioned behind the honeycomb light filtering structure 180 (or exiting from the ring aperture 125 to the outside world), the path of the light must be within a limited angular deviation from a normal relative to the surface of the ring aperture 125, e.g., within a limited angular deviation of being parallel to a central axis 186 of the lens 120. Otherwise, the light hits the walls 184 and is absorbed thereby. Desirably, in order to minimize scattering and/or diffraction that might be caused by the walls 184, the walls are preferably as smooth/flat and thin (e.g., less than 0.1 mm) as possible.

Figure 5B:
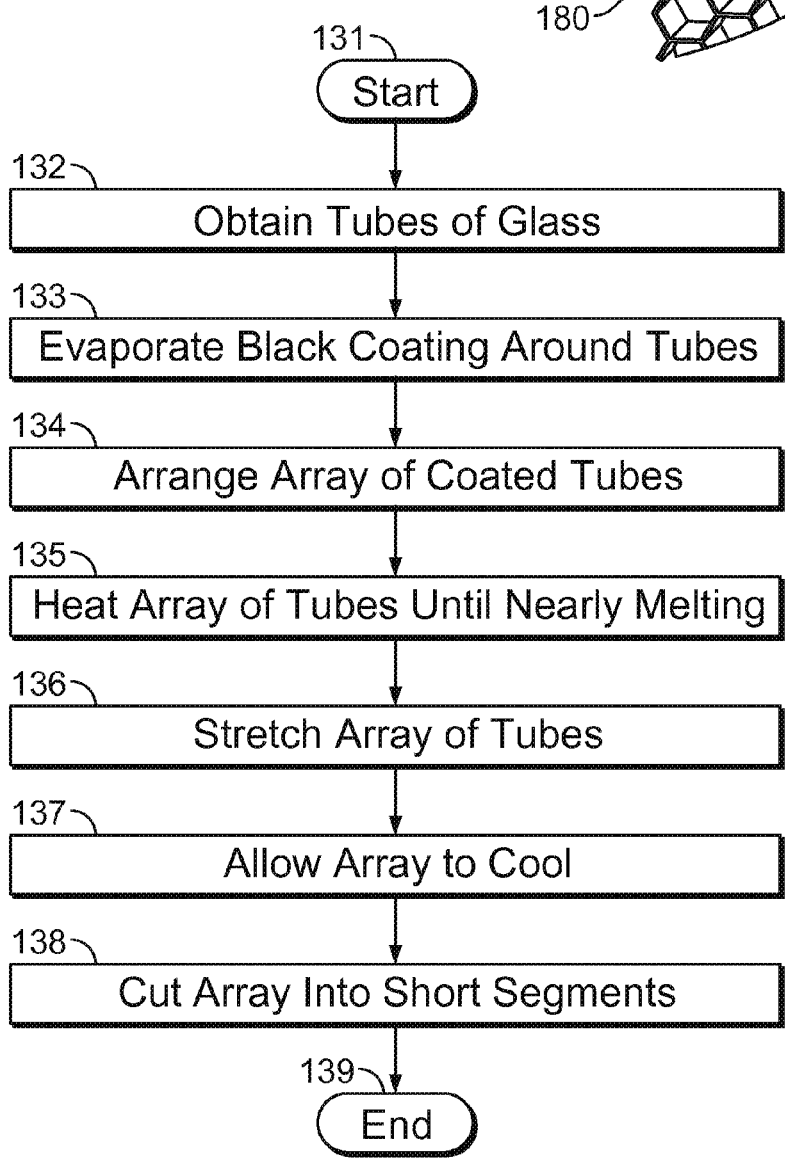
FIG. 5B is a flow chart illustrating exemplary steps that can be followed in manufacturing the honeycomb light filtering structure of FIG. 5A.

The honeycomb light filtering structure 180 can be manufactured in a number of manners. Steps of one exemplary process for manufacturing such a structure are shown in FIG. 5B. As shown, after starting at a step 131, at a step 132 a plurality of transparent tubes of glass are obtained. Next, at a step 133, a black (or other light absorptive) coating is evaporated (or otherwise applied) to the outer surfaces of the glass tubes and, at a step 134, the plurality of tubes are arranged side-by-side lengthwise into an array of tubes, such that the respective transparent inner portions of the tubes are separated from one another by the black exteriors of the tubes. Then, at a step 135, the array of tubes is heated up to a point where the tubes are nearly melting. At that point, at a step 136, the array of tubes is stretched lengthwise such that the tubes, which heretofore were of fairly large cross-section, are reduced in cross-section. Then, at a step 137, the stretched array of tubes is allowed to cool. Finally, at a step 138, the stretched array of tubes is cut into short segments that can be used to form a honeycomb light filtering structure, at which the process is ended at a step 139. The honeycomb shape is only one possible embodiment of this filter; another would be concentric rings (e.g., concentric rings of light absorptive coating separating concentric light-conducting channels), which would advantageously permit optical skew rays while blocking rays at larger field angles. Also, various other regular repeating or "parquet-type" patterns of multiple light-conducting channels separated by light absorptive material could also be used, including patterns involving multiple diamond-shaped, rectangular-shaped, or square-shaped channels.

Figure 6B:
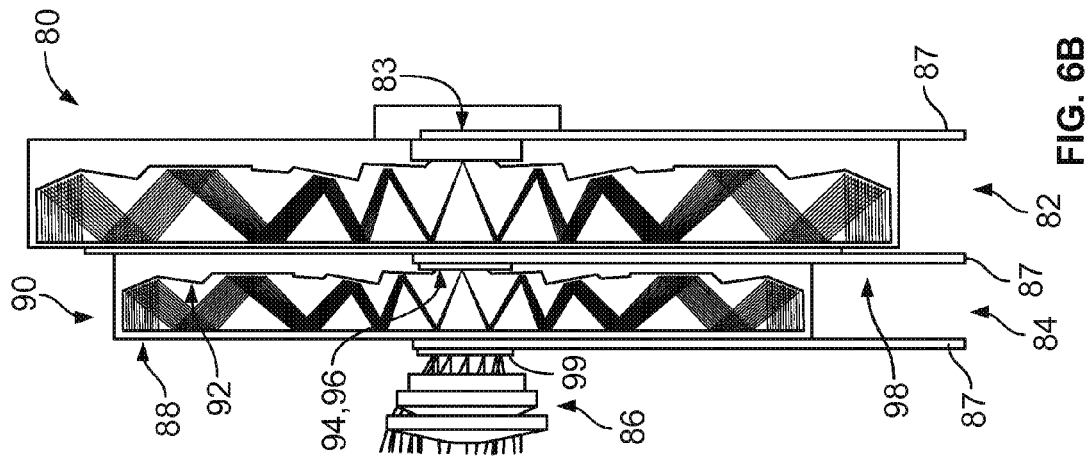
FIGS. 6A and 6B respectively show a front elevation view and a related cross-sectional view of an exemplary multi-lens imaging system employing a pair of lenses of the type shown in FIGS. 1A and 1B, where the lenses are stacked longitudinally.
Figure 6A:
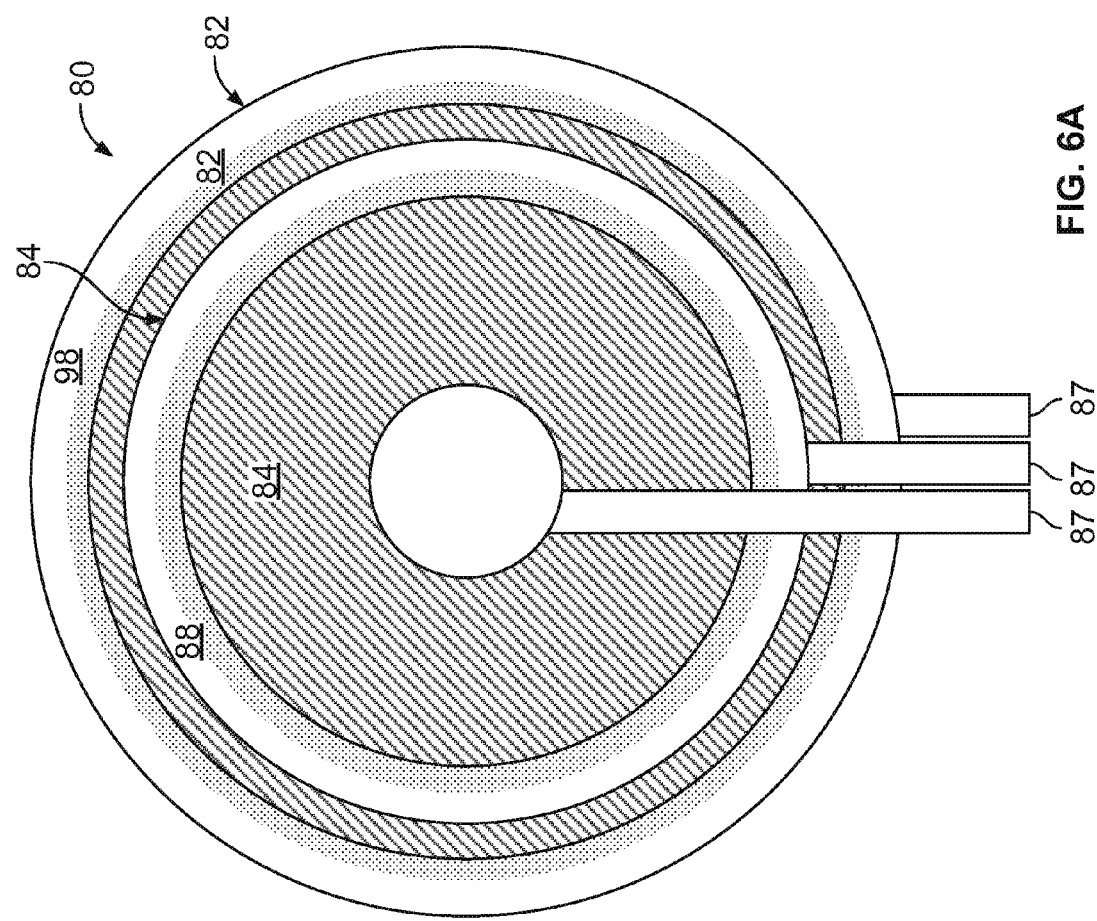
Figure 8A:
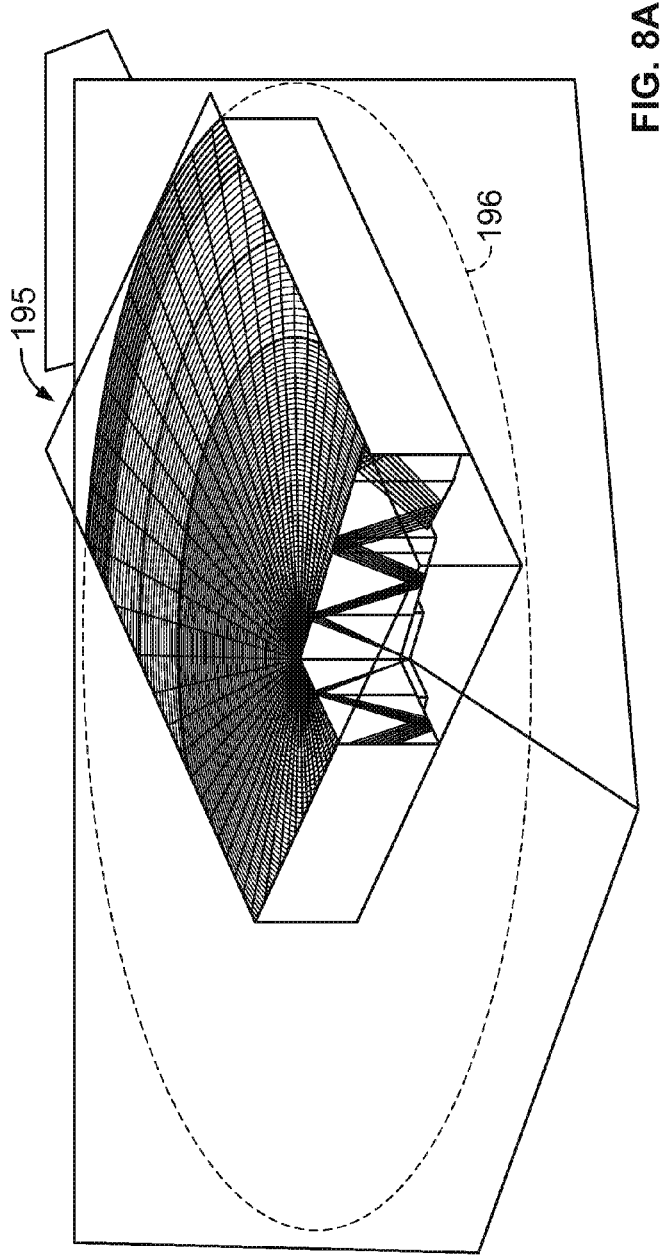
FIGS. 8A and 8B show two exemplary embodiments of lenses formed merely from lens sections.

In additional embodiments of the present invention, one or more of the lenses/imaging systems such as the lenses 20, 120 and imaging systems 10, 110 can be combined with one another, and/or with other conventional elements, in a variety of combination arrangements to achieve a variety of different goals. Further, as will be described in further detail with respect to FIG. 8, in some embodiments only portions of a full lens need be employed. Turning to FIGS. 6A and 6B in particular, front elevation and cross-sectional views of a first exemplary combination device 80 are shown, respectively. As shown, the combination device 80 includes not merely a first lens 82, but also a second lens 84 and a third lens 86, with the three lenses being "stacked" such that the first lens 82 is positioned behind the second lens 84 and the second lens is positioned behind the third lens 86, relative to the direction from which incoming light is being received.

Referring to FIG. 6B in particular, the first lens 82 is an 8-folded lens that is largely identical to the lens 20 discussed above with respect to FIGS. 1A-1B and directs light toward a first imager 83. That is, the first lens 82 includes not only a ring aperture 98 at which it receives incoming light, but also includes inner surfaces by which the incoming light is reflected eight times and eventually directed to a central aperture, at which is located the first imager 83. Likewise, the second lens 84 also is a multiple reflective (in this example, 8-folded) lens that receives incoming light through a ring aperture 88 and subsequently reflects the light back and forth circumferentially inward by way of inner surfaces of the lens until the light reaches a central aperture 94 at which is located a second imager 96. The third lens 86, unlike the first and second lenses 82, 84, is not a multiple reflective lens but rather is a conventional lens, such as a conventional compound refractive lens, that focuses light onto a third imager 99. Information from the imagers 83, 96 and 99 can be output for further processing or other use by way of three respective communication links 87, which could be hardwired links or, alternatively, could be wireless communication links.

While both the first and second lenses 82 and 84 are the same type of lens, the lenses differ from one another in size. In particular, the first lens 82 has a larger diameter than the second lens 84, such that the ring aperture 88 around the second lens 84 has an outer diameter that is smaller than the inner diameter and outer diameter of the ring aperture 98 of the first lens. The difference in the diameters of the respective ring apertures 88, 98 is sufficiently great that the positioning of the second lens 84 in front of the first lens 82 does not impede the transmission of light into the ring aperture 98 of the first lens. That is, the first lens 82 substantially concentrically surrounds the second lens 84 in such a manner that the second lens does not block the path of light into the first lens 82. In addition to having different outer diameters, the thickness of the second lens 84 is also somewhat smaller than that of the first lens 82, albeit both lenses act to reflect light eight times in between their front and rear inner surfaces.

Through the use of the first, second and third lenses 82, 84, and 86, the combination device 80 is able to simultaneously receive, focus and develop images based upon incident light at three different frequencies, or for three different focal length imaging systems, or some combination of the two. In one embodiment for example, by virtue of the first lens 82, the first imager 83 is able to develop images of light in the infrared range while, at the same time, by virtue of the second lens 84, the second imager 96 is able to develop images of light in the visible light wavelength range with a focal length in the telescopic range and, by virtue of the third lens 86, the third imager 99 is able to develop images in the visible light wavelength range with a wide angle field of view corresponding to a lens with a short focal length. Thus, by stacking or sandwiching multiple different lenses of different types together, at least one of which is a multiple reflective lens, the combination device 80 is able to provide data outputs that could be processed by a processor (not shown) and utilized for a variety of purposes, such as preparing a composite image reflective of all of the data.

The combination device 80 shown in FIGS. 6A and 6B is only one example of a multitude of different combination devices that can be built utilizing multiple lenses, one or more of which is a multiple reflective lens. In yet another embodiment, not shown, a conventional lens could be assembled at the center of a multiple reflective lens such as that shown in FIGS. 1A-2B, where both the conventional lens and the multiple reflective lens were designed to direct light towards a single, centrally-positioned shared imager. If such a device was accompanied by a switch that allowed for the imager to switch between the light emanating from each of the two lenses, it would be possible to switch between two scenes as observed by way of two different lenses, through the use of a single imager.

Figure 7A:
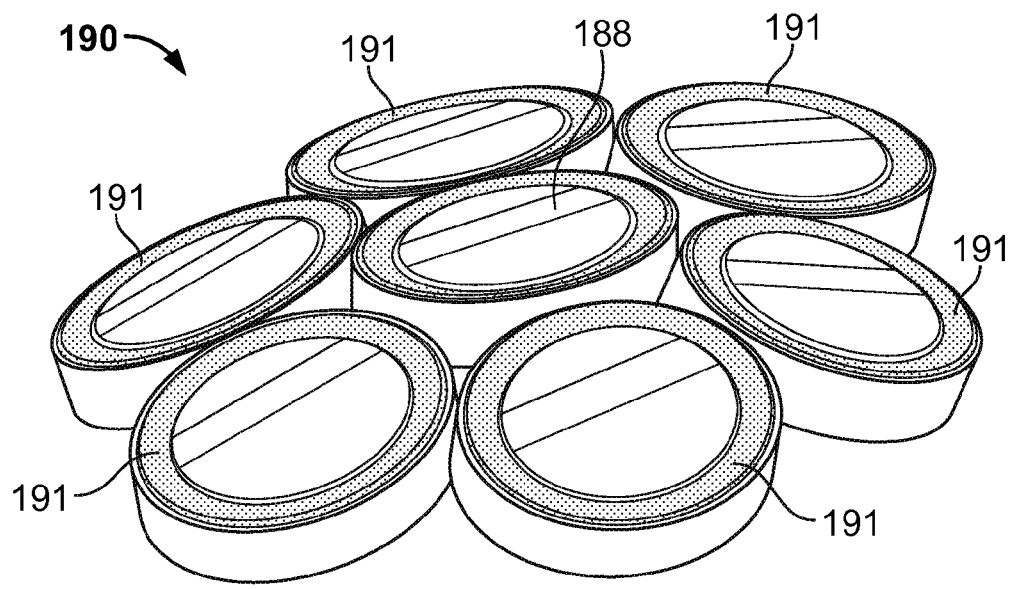
FIGS. 7A and 7B respectively show two other exemplary multi-lens imaging systems employing several of the lenses of the type shown in FIGS. 2A and 2B, where the lenses are arranged generally side-by-side relative to one another.
Figure 7B:
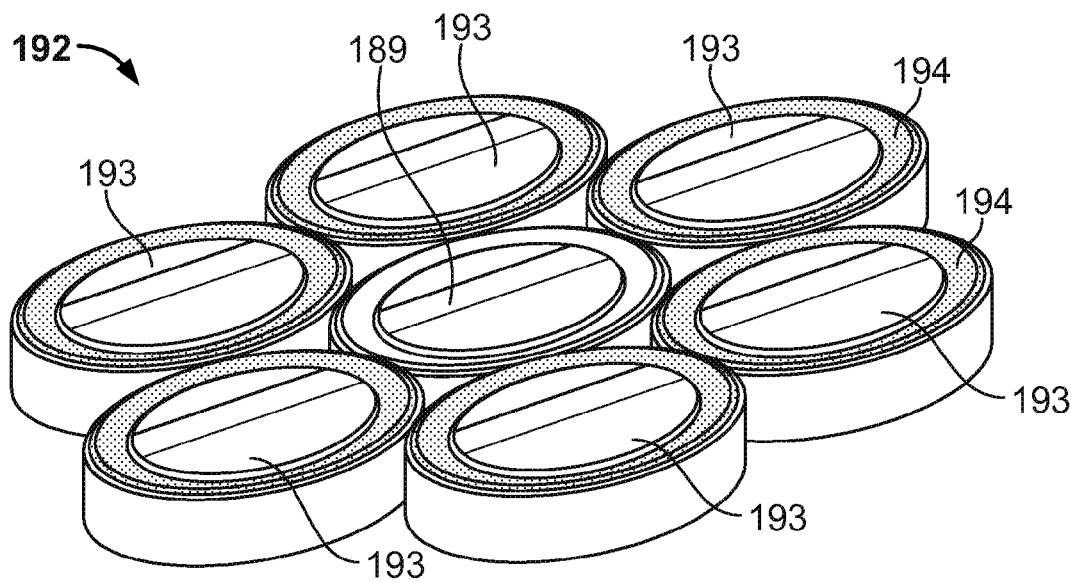

Referring to FIGS. 7A-7B, two additional combination devices 190 and 192 are also shown in which multiple lenses are positioned adjacent to or "side-by-side" one another rather than stacked axially. Such an arrangement can be termed a "multi-aperture widefield imager" insofar as the multiple lenses effectively constitute multiple apertures and the imaging information they provide together can allow for the generation of a relatively wide field image or montage. More particularly with respect to the combination device 190 of FIG. 7A, that device includes seven multiple reflective lenses, where six of the lenses are outlying lenses 191 that are situated around a seventh, central lens 188 in a flower petal arrangement. As shown, in order to achieve an advantageous wide field of view, in the present embodiment the six outlying lenses 191 are tilted away from the central lens 188 by approximately 7.5 degrees (or some other appropriate angle). That is, a respective central axis of each of the six outlying lenses 191 is tilted outward away from a central axis of the central lens 188 by 7.5 degrees (or other appropriate angle), such that all of the six outlying lenses are also tilted away from one another.

As for the combination device 192 of FIG. 7B, that device also includes seven multiple reflective lenses, where six of the lenses are outlying lenses 193 that are situated around a seventh, central lens 189 in a flower petal arrangement. In contrast to the combination device 190, however, the outlying lenses 193 in the device 192 are not tilted relative to the central lens 189. Rather, each of the six outlying lenses 193 (but not the central lens 189) includes a respective diffraction (possibly holographic) grating 194 positioned above its respective ring aperture such that, for incoming light to enter the respective lens, the light must pass through the respective diffraction grating. Although each of the outlying lenses 193 includes a respective one of the diffraction gratings 194, the respective diffraction grating for each lens differs from that of every other one of the outlying lenses, such that each of the outlying lenses performs beamsteering in a different direction, that is, each of the outlying lenses effectively is configured to preferentially receive light incoming from a slightly different angle. The grating period $\Lambda_g$ for each diffraction grating can be calculated according to the following relationship, where $\lambda$ is the wavelength of the (predominant portion) of the light being received and $\theta$ is the beamsteering angle of interest:

$$\Lambda_g = \lambda/(2 \sin(\theta/2)) \quad (1)$$

Although FIG. 7B shows one embodiment of a multi-aperture widefield imager that employs diffraction gratings in connection with a number of the lenses forming the imager, other configurations are also possible. For example, instead of employing diffraction gratings, prisms can be employed. Also, while FIG. 7B shows the diffraction gratings as being employed only on each of the outlying lenses 193, in other embodiments diffraction gratings (or prisms) could be employed on only some of the outlying lenses and/or on the central lens. Further, in other embodiments adaptive techniques could be employed to allow for beamsteering in an adaptive manner. For example, discrete switchable gratings achieved using high-resolution liquid crystal modulator(s) and/or adaptive micro-fluidic prisms could be employed.

In at least some embodiments, one or more of the lenses of a multi-aperture widefield imager can also include, or operate in combination with, a honeycomb light filtering structure such as that discussed above with respect to FIGS. 5A-5B. Typically, if such a structure was employed on a lens in combination with a diffraction grating as shown in FIG. 7B, the honeycomb light filtering structure would be positioned between the diffraction grating and the ring aperture of the lens. Consequently, light entering the device would first be bent/steered by the diffraction grating, then undesirable (stray) light rays would be removed by the honeycomb light filtering structure, and then the light would enter the ring aperture for focusing. Further, it should be noted that, with respect to many embodiments of multi-aperture widefield imagers such as those shown in FIGS. 7A-7B, post-detection processing of the detected image can improve the overall image quality of the final output.

Although the combination device 80 of FIGS. 6A-6B includes three lenses stacked together, in alternate embodiments two or more than three lenses of the same or different types can be sandwiched together. Likewise, although each of the combination devices 190, 192 employs a set of seven lenses positioned side-by-side one another in a flower petal arrangement, in alternate embodiments a different number of multiple lenses could be employed side-by-side and/or in a different arrangement. Indeed, the present invention is intended to encompass all multiple-lens systems in which one or more folded or multiple reflective lenses are employed. Further, the present invention is intended to encompass additional combination structures in which not only multiple lenses are positioned side-by-side one another as in FIGS. 7A-7B but also one or more of the side-by-side lenses is a multiple-lens stack of lenses such as that of FIGS. 6A-6B.

While the lens designs described above are generally circularly symmetric, it is also possible to modify the final shape of such lenses/lens systems into non-circularly symmetric forms. Referring to FIG. 8, for example, a section 195 of a circular lens 196 can be cut from the circular lens (or otherwise formed) and used successfully as a complete lens by itself, even where the section is a relatively small (e.g., 10-15%) proportion of the circular lens. Such a sectional lens, because of it smaller size, can be especially useful for applications (e.g., telescopic applications) requiring a lens that is small not only in terms of its axial thickness but also in terms of its surface area (e.g., the area of the lens normal to the general direction of incoming light). Notwithstanding the small surface area of the lens, it is still possible for a full image to be detected, albeit with somewhat lower light collection efficiency and slightly less resolution.

Figure 8B:
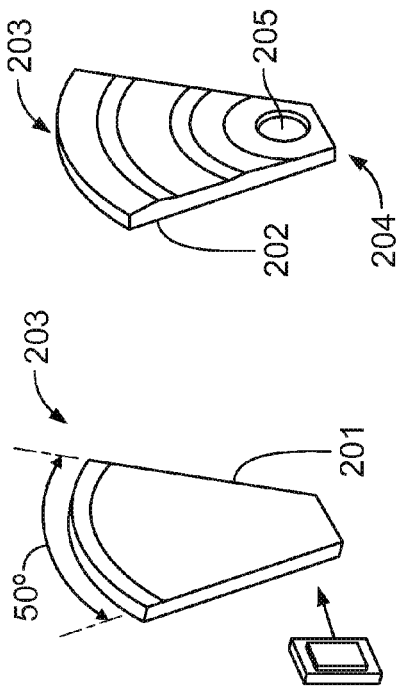

In order for such a sectional lens to operate most successfully, the sectional lens will preferably not be simply pie-shaped such that the lens diminishes in cross-sectional size from its largest extent where it receives light (e.g., corresponding to a ring aperture) to a point proximate the imager. Such a pie-shape would tend to undermine proper operation of the lens, since many light rays received by such a lens would experience undesirable reflection/refraction/diffraction as they encountered the sides of the lens while proceeding from the periphery (ring aperture) toward the imager. Rather, preferably, a sectional lens will tend to have a shape in which the effective cross-sectional extent of the lens does not diminish as much (or at all) as one proceeds from the perimeter (ring aperture) toward the imager, such that light entering the lens at its perimeter (ring aperture) can take its natural path(s) toward the imager. Thus, for example with respect to the section 195 shown in FIG. 8A, the section encompasses only a portion of the outer periphery of the circular lens 196 and its ring aperture (in this case, about a quadrant thereof), but encompasses a preponderance of the central portion of the circular lens. Further for example as shown in FIG. 8B, in another embodiment, a section 203 (both a front surface 201 and a back surface 202 of which are shown) can have a modified pie-shape. As is evident, a central region 204 of the section 203 is sufficiently broad as to extend around a central orifice 205 within the back surface 202.

Although FIG. 8 shows one exemplary sectional lens, the present invention is also intended to encompass sectional lenses having other shapes including, for example, a semicircular (or substantially semicircular) lens. Further for example, lenses of non-circular forms (e.g., oval or rectangular shaped-lenses) are also possible. Additionally, in at least some embodiments, the use of a sectional lens makes possible the development of a combination lens or "hybrid imager", one example of which is shown in FIG. 9.

Figure 9:
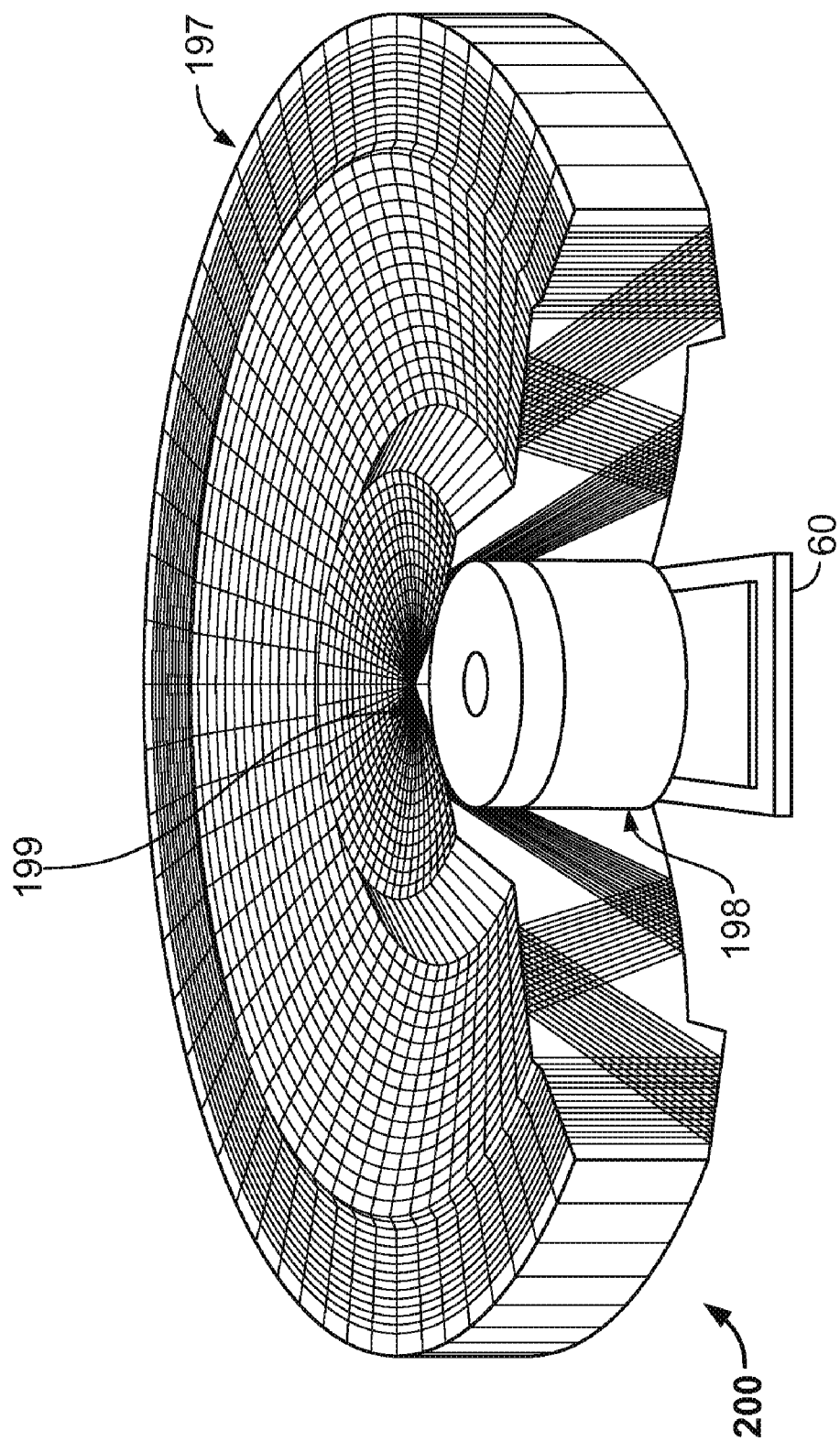
FIG. 9 shows an exemplary embodiment of a hybrid imaging system employing a portion of a lens such as that shown in FIGS. 2A and 2B.

Specifically with respect to FIG. 9, a hybrid imager 200 is shown to include both a multiple reflective lens 197 and a secondary lens 198. The multiple reflective lens 197 is a sectional lens that extends approximately 270 degrees about a central axis 199 so as to have approximately the appearance of a letter "C", and is capable in the present embodiment of providing a 10 degree full angle field of view (e.g., a telescopic/telephoto field of view). The secondary lens 198 in contrast can be a conventional lens such as the third lens 86 discussed above with respect to FIGS. 6A-6B, and in the present embodiment is capable of providing a 35 degree full angle field of view (e.g., a wide angle field of view).

By positioning the secondary lens 198 adjacent (or very close) to the central axis 199, it is possible for both the focused output light from the multiple reflective lens 197 and the output light provided by the secondary lens 198 to be directed onto an imager 60. Thus, a single imager is effectively shared, with the telephoto light illuminating one side of the imager and the wide angle light illuminating the other side of the imager. Full range zoom can be accomplished with a combination of optical zoom (telescopic or wide angle) and digital zoom. Through the use of the single, shared, large pixel-count imager 60, the present embodiment obviates the need for two separate imagers to independently receive light from the multiple reflective lens and the conventional lens, and thus can be less expensive to manufacture.

In all of the above-described embodiments involving a multiple reflective lens (or multiple such lenses), regardless of the particular shape of the lens, or whether the lens fully extends around its central region or only partially extends around its central region, the lens still operates by directing light between an outer periphery of the lens (e.g., a portion corresponding to the circumference of a fully-circular lens), and an inner region of the lens (e.g., a portion corresponding to the central region of a fully-circular lens). That is, regardless of the shape of the lens, the lens still operates by directing light from an outer aperture to an inner aperture or vice-versa, by way of multiple reflections upon concentric (or concentric-like) zones along one or both of the inner (internally reflective) surfaces of the lens. At the same time, because the lenses can take on a variety of different shapes, it becomes possible to adapt each lens design to accommodate the physical form requirements of each specific application, as for example in a cellular phone camera or telescopic application.

It is specifically intended that the present invention not be limited to the embodiments and illustrations contained herein, but include modified forms of those embodiments including portions of the embodiments and combinations of elements of different embodiments as come within the scope of the following claims.

We claim:

1. A lens comprising:
    a first inward-facing surface that is at least partly reflective;
    a second inward-facing surface that is at least partly reflective;
    a first aperture that is positioned around at least a portion of an outer periphery of one of the first and second inward-facing surfaces; and
    a second aperture existing proximate a central region of the lens;
    wherein the first and second inward-facing surfaces of the lens are arranged with respect to each other to direct light entering through the first aperture to proceed along a path within the lens between the first and second inward-facing surfaces so as to reflect the light at least twice on at least one of the first and second inward-facing surfaces as the light travels along the path between the first aperture and the second aperture.

2. The lens of claim 1, wherein the second inward-facing surface has a plurality of concentrically-spaced reflective surfaces.

3. The lens of claim 2, wherein the second inward-facing surface includes at least one blackened detent, and wherein at least two of the plurality of concentrically-spaced reflective surfaces are separated from one another by the blackened detent.

4. The lens of claim 2, wherein at least one of the concentrically-spaced reflective surfaces includes an angle-selective dielectric coating configured to restrict transmission of at least some light.

5. The lens of claim 2, wherein the first aperture is curves around the first inward-facing surface, and the second aperture is formed within a central portion of the second inward-facing surface.

6. The lens of claim 2, wherein the first inward-facing surface has an additional plurality of concentrically-spaced reflective surfaces.

7. The lens of claim 2, wherein the light is reflected a total of one of three, four, six and eight times by the first and second inward-facing surfaces.

8. The lens of claim 2, wherein the second inward-facing surface has four concentrically-spaced reflective surfaces separated by three non-reflective surfaces.

9. The lens of claim 2, wherein the concentrically-space reflective surfaces are aspheric surfaces, and wherein assembly of the lens includes at least one of the following:
   diamond machining of a single lens plate to provide the first and second inward-facing surfaces; and
   diamond machining of a pair of lens plates, wherein the first inward-facing surface is formed on a first of the pair of lens plates and the second inward-facing surface is formed on a second of the pair of lens plates.

10. The lens of claim 1, wherein the lens has a substantially circular shape as viewed from a front end of the lens.

11. The lens of claim 1 wherein, as viewed from a front end of the lens, the lens has an exterior shape that can be considered to be a portion of a larger circular shape.

12. The lens of claim 11, wherein the exterior shape of the lens is substantially that of a section of a circle.

13. The lens of claim 12, wherein the shape includes both a peripheral portion and an interior portion, and wherein the interior portion extends a greater angular extent around a central axis of the circle than a peripheral portion so that a predominant portion of the light received through the first aperture is capable of proceeding within the lens to the second aperture.

14. The lens of claim 1, further comprising at least one additional structure capable of light reflection, light refraction, light diffraction and light absorption, wherein the at least one additional structure is positioned proximate the first aperture.

15. The lens of claim 14, wherein the at least one additional structure includes at least one of a diffraction grating, a prism, and a light filtering structure.

16. The lens of claim 1, further comprising an actuator, wherein the first and second inward-facing surfaces are formed on first and second structures, and the actuator is capable of moving the first and second structures toward and away from each other, so that a focus of the lens is changed.

17. The lens of claim 16, wherein the actuator is a piezoelectric actuator that serves to squeeze focus the lens.

18. The lens of claim 16, wherein the actuator is one of a hydraulic or a microfluidic actuator that serves to squeeze focus the lens.

19. An imaging system comprising the lens of claim 1, wherein the light travels within the lens from the first aperture to the second aperture.

20. A system comprising the lens of claim 1, wherein the light travels within the lens from the second aperture to the first aperture.

21. The system of claim 20, further comprising a light source positioned proximate the second aperture, wherein the light source generates the light, and the lens serves to output collimated light out of the first aperture based upon the generated light.

22. The system of claim 21, wherein lens serves as a laser collimator.

23. A camera device comprising the lens of claim 1 and a sensor.

24. The camera device of claim 23, wherein the camera device is a cell phone camera.

25. The camera device of claim 23, wherein the camera device is at least one of a flat camera, a credit card camera, a security camera, a miniature camera, and a helmet-mounted camera.

26. A telescope comprising the lens of claim 1.

27. A lens assembly comprising the lens of claim 1 and additionally comprising a second lens, wherein each of the lenses is configured to receive and focus a subset of a totality of receivable light incident on the lens assembly.

28. The lens assembly of claim 27, wherein the second lens has an outer diameter that is less than an inner diameter of the first aperture of the first lens, and wherein the second lens is positioned in front of the first lens such that incoming light can be received at each of the first aperture and an additional aperture of the second lens.

29. The lens assembly of claim 28, further comprising a third lens that is a conventional lens.

30. The lens assembly of claim 27, wherein the first and second lenses are positioned side-by-side one another.

31. The lens assembly of claim 30, further comprising five additional lenses, wherein the first lens is a central lens and each of the second lens and the five additional lenses is positioned around the first lens in a flower petal arrangement.

32. The lens assembly of claim 30, wherein the first lens is tilted relative to the second lens.

33. The lens assembly of claim 27, wherein at least one of a diffraction grating and a prism is mounted adjacent to at least one of the first aperture of the first lens and an additional aperture of the second lens.

34. The lens assembly of claim 33, wherein the diffraction grating is mounted proximate the additional aperture, and wherein a honeycomb light filter structure is positioned between the diffraction grating and the additional aperture.

35. An imaging system comprising:
   means for sensing light; and
   a first lens including
      a first inward-facing surface that is at least partly reflective;
      a second inward-facing surface that is at least partly reflective;
      a first aperture that is positioned around at least a portion of an outer periphery of one of the first and second inward-facing surfaces; and
      a second aperture existing proximate a central region of the lens and at which is positioned the means for sensing light;
      wherein the first and second inward-facing surfaces of the lens are arranged with respect to each other to direct light entering through the first aperture to proceed along a path within the lens between the first and second inward-facing surfaces so as to reflect the light at least twice on at least one of the first and second inward-facing surfaces as the light travels along the path between the first aperture and the second aperture.

36. The imaging system of claim 35, wherein the means for sensing light is an imager that generates image signals in response to receiving the light traveling from the first aperture to the second aperture within the lens.

37. The imaging system of claim 35, wherein the imaging system includes a lens assembly that includes both the first lens and also a second lens, wherein incoming light incident upon the lens assembly is capable of being used to form two different images.

38. The imaging system of claim 37, wherein each of the two different images is user-selectable by way of a switch linked at least indirectly to the means for sensing light.

39. The imaging system of claim 37, wherein the first lens is positioned behind the second lens.

40. The imaging system of claim 39, wherein the second lens is one of a conventional lens and a multiple reflective lens.

41. The imaging system of claim 37, wherein the first lens is positioned on a side of the second lens.

42. The imaging system of claim 35, wherein the first lens has a shape that is substantially a section of a circle.

43. The imaging system of claim 42, further comprising a second lens positioned within a region unoccupied by the first lens and proximate to a central axis of the first lens, and wherein the means for sensing light is a shared imager that is positioned so as to be capable of receiving light both from the first lens and the second lens.

* * * * *

UNITED STATES PATENT AND TRADEMARK OFFICE
CERTIFICATE OF CORRECTION

PATENT NO. : 7,898,749 B2
APPLICATION NO. : 11/916062
DATED : March 1, 2011
INVENTOR(S) : Joseph Ford, Eric Tremblay and Shaya Fainman It is certified that error appears in the above-identified patent and that said Letters Patent is hereby corrected as shown below:

Title Page, Item (56), page 2, under "OTHER PUBLICATIONS", in Column 2, Line 7, please delete "Ultrathing" and insert -- Ultrathin --, therefor.

In Column 3, Line 59, please delete "EMBODIMENT" and insert -- EMBODIMENTS --, therefor.

In Column 11, Line 19, please delete "613" and insert -- 6B --, therefor.

In Column 15, Line 4, in Claim 9, please delete "concentrically-space" and insert -- concentrically-spaced --, therefor.

Signed and Sealed this
Twenty-sixth Day of April, 2011

David J. Kappos
*Director of the United States Patent and Trademark Office*